US010698815B2

(12) United States Patent
Hess et al.

(10) Patent No.: US 10,698,815 B2
(45) Date of Patent: Jun. 30, 2020

(54) NON-BLOCKING CACHING FOR DATA STORAGE DRIVES

(71) Applicant: HGST Netherlands B. V., Amsterdam (NL)

(72) Inventors: Randall L. Hess, Colorado Springs, CO (US); Berck E. Nash, Divide, CO (US); James M. Reiser, Colorado Springs, CO (US); Randy L. Roberson, Lutz, FL (US); Kris B. Stokes, Colorado Springs, CO (US); Jesse L. Yandell, Colorado Springs, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 8 days.

(21) Appl. No.: 14/788,190

(22) Filed: Jun. 30, 2015

(65) Prior Publication Data

US 2017/0003894 A1 Jan. 5, 2017

(51) Int. Cl.
*G06F 12/0802* (2016.01)

(52) U.S. Cl.
CPC .. *G06F 12/0802* (2013.01); *G06F 2212/1032* (2013.01)

(58) Field of Classification Search
CPC ............ G06F 9/30043; G06F 9/30007; G06F 12/0893; G06F 12/0804; G06F 12/0879; G06F 12/0855; G06F 12/0868; G06F 3/0688; G06F 2212/222; G06F 12/0808; G06F 9/5016; G06F 17/30902;

(Continued)

(56) References Cited

U.S. PATENT DOCUMENTS 5,555,391 A * 9/1996 De Subijana ....... G06F 12/0804
710/30
5,802,586 A * 9/1998 Jones .................. G06F 12/0846
365/189.04

(Continued)

OTHER PUBLICATIONS

Wan, Jiguang et al., "High Performance and High Capacity Hybrid Shingled-Recording Disk System", located at http://ieeexplore.ieee.org/xpl/articleDetails.jsp?tp=&arnumber=633777, Cluster Computing, 2012 IEEE International Conference on Sep. 24-28, 2012 in Beijing, China, 2 pages.

(Continued)

*Primary Examiner* — Yaima Rigol

(57) ABSTRACT

To provide enhanced operation of data storage devices and systems, various systems, apparatuses, methods, and software are provided herein. In a first example, a data storage device accumulates write data into a cache storage region prior to committing into an archive storage region and maintains a data structure that tracks the write data in the cache storage region. Responsive to receiving first write data into the cache storage region, the data storage device establishes first tracking elements in the data structure for the first write data in the cache storage region. Responsive to receiving second write data directed to storage locations overlapping the first write data, the data storage device accepts the second write data into the cache storage region and establishes second tracking elements in the data structure for the second write data in the cache storage region without modifying the first tracking elements.

21 Claims, 4 Drawing Sheets

(58) Field of Classification Search
CPC .............. G06F 12/0815; G06F 12/084; G06F 12/0888; G06F 2212/224; G06F 12/0802; G06F 12/0891; G06F 9/467; G06F 2212/621; G06F 2212/604; G06F 13/28
See application file for complete search history.

(56) References Cited

U.S. PATENT DOCUMENTS

| | | | |
|---|---|---|---|
| 6,904,456 B2 | 6/2005 | Cox | |
| 8,593,748 B1 | 11/2013 | Bandic et al. | |
| 8,631,197 B2 | 1/2014 | Hall | |
| 8,793,431 B2 | 7/2014 | Bandic et al. | |
| 8,850,127 B2 | 9/2014 | Dantzig et al. | |
| 8,874,875 B2 | 10/2014 | Bandic et al. | |
| 8,909,859 B2 | 12/2014 | Bandic et al. | |
| 9,250,811 B1* | 2/2016 | Patiejunas | G06F 3/061 |
| 9,417,814 B1* | 8/2016 | Hall | G06F 3/0653 |
| 9,697,219 B1 | 7/2017 | Wang et al. | 707/823 |
| 2005/0235067 A1* | 10/2005 | Creta | G06F 13/4027 710/5 |
| 2005/0240715 A1* | 10/2005 | Desai | G06F 12/08 711/3 |
| 2008/0155307 A1* | 6/2008 | French | G06F 11/2089 714/3 |
| 2009/0024815 A1* | 1/2009 | Iwamura | G06F 11/2064 711/162 |
| 2010/0070701 A1* | 3/2010 | Iyigun | G06F 11/1441 711/113 |
| 2010/0174853 A1* | 7/2010 | Lee | G06F 12/0246 711/103 |
| 2011/0191522 A1* | 8/2011 | Condict | G06F 12/123 711/103 |
| 2013/0335856 A1* | 12/2013 | Tanabe | G11B 19/04 360/76 |
| 2014/0089728 A1* | 3/2014 | Veal et al. | G06F 11/20 714/6.21 |
| 2016/0019149 A1* | 1/2016 | Sivaramakrishnan | G06F 12/0811 711/122 |
| 2016/0085673 A1* | 3/2016 | Ash | G06F 12/0868 711/142 |
| 2016/0162215 A1* | 6/2016 | Jayaraman | G06F 3/0659 711/103 |

OTHER PUBLICATIONS

Herlihy, Maurice et al., "Transactional Memory: Architectural Support for Lock-Free Data Structures", located at http://www.cs.utexas.edu/~pingali/CS395T/2009fa/lectures/herlihy93transactional.pdf, Digital Equipment Corporation and Cambridge Research Library, 12 pages, USA.

* cited by examiner

US 10,698,815 B2

NON-BLOCKING CACHING FOR DATA STORAGE DRIVES

TECHNICAL FIELD

Aspects of the disclosure are related to the field of data storage and hard disk drive arrays in data storage systems.

TECHNICAL BACKGROUND

Computer and network systems such as personal computers, workstations, server systems, and cloud storage systems, typically include data storage elements for storing and retrieving data. These data storage elements can include data storage devices, such as hard disk drives, solid state storage devices, hybrid storage devices, tape storage devices, and other mass storage devices.

Magnetic storage drives, such as hard disk drives, can employ various magnetic storage technologies. One such storage technology includes data storage drives with shingled magnetic recording (SMR) technology to increase storage densities on associated storage media. SMR technology physically overlaps adjacent data tracks on a magnetic storage media, in contrast to a non-overlapping recording technology, such as parallel magnetic recording (PMR) or other non-overlapping recording techniques.

As computer systems and networks grow in numbers and capability, there is a need for more and more storage capacity. Cloud computing and large-scale data processing systems have further increased the need for digital data storage systems capable of transferring and holding immense amounts of data. Data centers can include a large quantity of data storage devices in various rack-mounted and high-density storage configurations. However, when data storage devices that employ SMR techniques attempt to service many random storage operations in short periods of time, such as writes and reads, slowdowns can occur due in part to the preference of SMR techniques for large bursts of sequential writes instead of random writes to random storage locations.

Overview

To provide enhanced operation of data storage devices and systems, various systems, apparatuses, methods, and software are provided herein. In a first example, a data storage drive is presented that includes storage media comprising a cache storage region and an archive storage region. The data storage drive includes a storage control system configured to accumulate write data into the cache storage region prior to committing into the archive storage region and maintain a data structure that tracks the write data in the cache storage region. Responsive to receiving first write data into the cache storage region, the storage control system is configured to establish first tracking elements in the data structure for the first write data in the cache storage region. Responsive to receiving second write data directed to storage locations at least partially overlapping with the storage locations of the first write data, the storage control system is configured to accept the second write data into the cache storage region and establish second tracking elements in the data structure for the second write data in the cache storage region without modifying the first tracking elements.

In another example, a method of operating a data storage device with storage media comprising a cache storage region and an archive storage region is presented. The method includes accumulating write data into a cache storage region prior to committing into an archive storage region. The method also includes maintaining a data structure that tracks the write data in the cache storage region. Responsive to receiving first write data into the cache storage region, the method includes establishing first tracking elements in the data structure for the first write data in the cache storage region. Responsive to receiving second write data directed to storage locations at least partially overlapping with the storage locations of the first write data, the method includes accepting the second write data into the cache storage region and establishing second tracking elements in the data structure for the second write data in the cache storage region without modifying the first tracking elements.

In another example, a data storage assembly is presented. The data storage assembly includes a plurality of data storage drives, each comprising storage media with a cache storage region and a shingled magnetic recording (SMR) storage region. The data storage assembly includes a storage control system configured to accumulate write data received over a host interface into a selected cache storage region prior to committing into a selected SMR storage region and maintain a data structure that tracks the write data in the selected cache storage region. Responsive to receiving first write data into the selected cache storage region, the storage control system is configured to establish first tracking elements in the data structure for the first write data in the selected cache storage region. Responsive to receiving second write data directed to storage locations at least partially overlapping with the storage locations of the first write data, the storage control system is configured to accept the second write data into the selected cache storage region and establish second tracking elements in the data structure for the second write data in the selected cache storage region without modifying the first tracking elements.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

High-density magnetic storage devices employ a variety of storage technologies. One such storage technology includes rotating magnetic media with shingled magnetic recording (SMR) technology which can be designated for use in hard disk drives. SMR technology allows for read/write heads to physically overlap adjacent data tracks on the storage media, in contrast to a non-overlapping recording technology, such as parallel magnetic recording (PMR) or a non-overlapping version of SMR, among others. Since SMR technology has overlapping data tracks on the storage media, sequential or burst write operations are preferred instead of random write operations.

When an overlapping track recording technique is employed, a sequential or burst write operation spanning one or more tracks can reduce unwanted corruption of already-written data on adjacent tracks of the data storage drive. To assist in performing sequential or burst write operations, a caching mechanism can be employed to first accumulate a threshold amount of write operations before a burst write of data to the associated archive portions of the data storage drives. However, when many write operations are cached before committing associated write data into an archive region, subsequent or intervening write or read operations to similar storage locations can be delayed or blocked until the write data is finished being committed. In the examples herein, non-blocking caching of write data in one or more data storage devices is presented. Non-blocking can refer to not rendering a storage block range or storage location inaccessible or blocked to a host system, such as due to overlapping write operations or cache commit operations.

Figure 1:
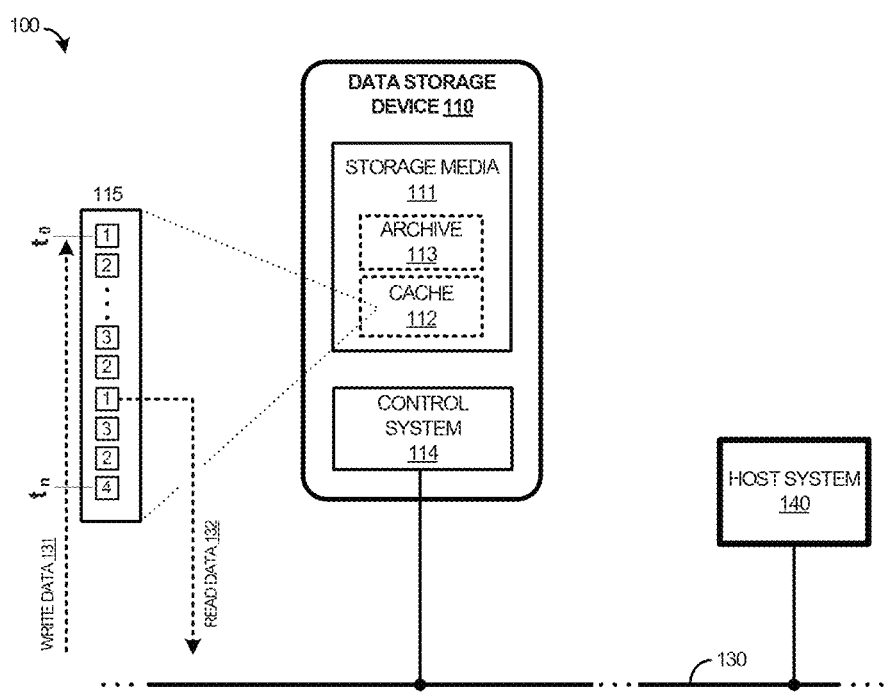
FIG. 1 is a system diagram illustrating a data system.

In a first example of a data storage device with non-blocking caching, FIG. 1 is presented. FIG. 1 is a system diagram illustrating data system 100. System 100 includes data storage device 110 and host system 140. Data storage device 110 and host system 140 communicate over storage link 130. Data storage device 110 can be included in an assembly that includes one or more data storage devices and one or more control systems. In FIG. 1, data storage device 110 includes control system 114 and storage media. Control system 114 is communicatively coupled to storage media 111. Although control system 114 is shown as internal to data storage device 110 in this example, it should be understood that in other examples control system 114 can be included in other elements external to data storage device 110. In some examples, data storage device 110 comprises a hard disk drive (HDD), a hybrid storage drive, or a solid state storage drive.

In operation, data storage device 110 receives read or write transactions over storage link 130 issued by host system 140. Responsive to read transactions, data storage device 110 can retrieve data stored upon storage media 111 for transfer to host system 140. Responsive to write transactions, data storage device 110 stores data on storage media 111. It should be understood that other components of data storage device 110 are omitted for clarity in FIG. 1, such as transaction queues, chassis, enclosures, fans, interconnect, read/write heads, armatures, preamps, transceivers, processors, amplifiers, motors, servos, enclosures, and other electrical and mechanical elements.

Figure 2:
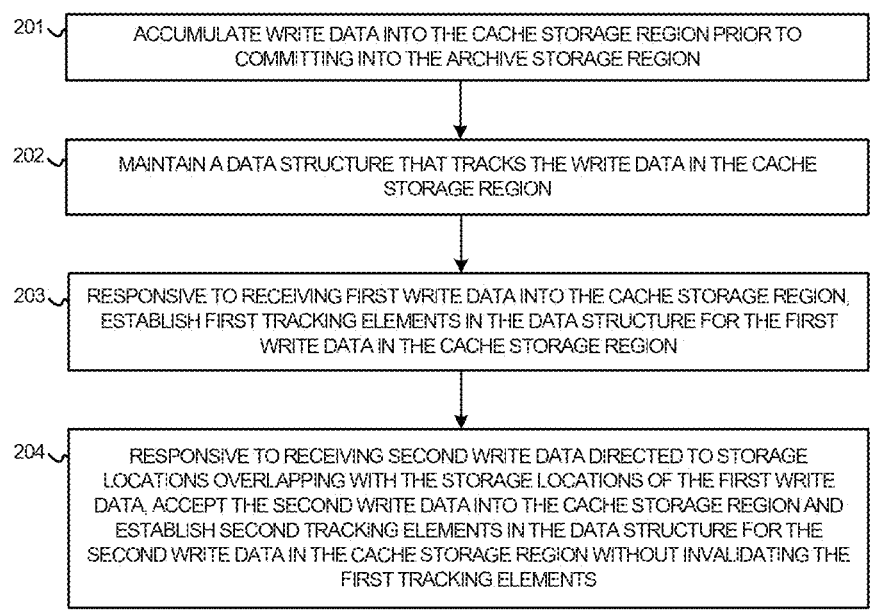
FIG. 2 is a flow diagram illustrating a method of operation of a data storage system.

To further illustrate the operation of data system 100, FIG. 2 is provided. FIG. 2 is a flow diagram illustrating a method of operating data storage device 110. The operations of FIG. 2 are referenced below parenthetically. In FIG. 2, data storage device 110 stores data on storage media 111 that comprises cache storage region 112 and archive storage region 113.

Cache storage region 112 comprises a randomly writeable storage region. This random write storage region can employ various random read/write storage techniques, such as PMR or non-SMR techniques. Archive storage region 113 can comprise a sequentially writable storage region. Some examples of archive storage region 113 comprise overlapping track recording techniques, such as SMR. In a specific example, archive storage region 113 comprises an SMR storage region and cache storage region 112 comprises a non-overlapping track SMR storage region. The non-overlapping type of SMR storage regions can use a widely-spaced SMR technique so that random read/writes are possible and adjacent tracks do not overlap as found in overlapping SMR techniques. In some examples, cache storage region 112 is included in other storage media, such as solid state storage media of hybrid storage drives or solid state drives. It should be understood that more than one archive storage region or cache storage region can be employed to store data, such as in mirroring, striping, or other redundancy techniques.

Data is stored responsive to various storage operations, such as write operations received by data storage array over storage link 130. Data storage device 110 receives storage operations transferred by host system 140 that comprise write operations for storage of write data on storage media 111 and read operations for retrieval of data already stored on storage media 111. In this example, the storage operations are received by control system 114 over storage link 130, and can be received into a transaction queue or input/output operations (IOs) queue for handling by control system 114.

In a specific example, storage control system 114 of data storage device 110 accumulates (201) write data into cache storage region 112 prior to committing into archive storage region 113. Storage control system 114 receives write operations over storage link 130 for storage of write data, and the write operations are directed to a write location on storage media 111. The write location can comprise an address, logical block address, physical block address, or other location identifier that describes a location on storage media to which the write data is to be written, which can also include logical unit designations, network addresses, or partition identifiers.

Storage control system 114 caches the write data for the write operations in cache storage region 112 of storage media 111 prior to transfer of the write data into at least archive storage region 113. In FIG. 1, several pieces of write data 131 are received over storage link 130 by control system 114, as shown in cache contents 115. Cache contents 115 illustrates a time-wise representation of portions of write data written into cache storage region 112. Data received earlier in time is represented by the "$t_0$" time, while data received later in time is represented by the "$t_n$" time.

Storage control system 114 maintains (202) a data structure that tracks the write data in cache storage region 112. As write data is received, the write data is tracked in cache storage region 112, such as using a data structure which can comprise a chronologically ordered ring structure of data nodes, where each of the nodes comprises a tracking element discussed herein. The ring structure can include nodes ordered according to order of receipt of associated write data and can each indicate block addresses to which the nodes correspond. In other examples, different data structures can be employed, such as a first-in, first-out (FIFO) data structure, linked list, or other data structures, including variations thereof. In FIG. 2, responsive to receiving first write data into cache storage region 112, storage control system 114 establishes (203) first tracking elements in data structure 115 for the first write data in cache storage region 112.

Tracking information for the write data can be maintained in a data structure in addition to any data structures used to store the write data in cache storage region 112. This tracking information can include information related to the storage location for a particular block of write data being tracked as well as sequencing information. In some examples, the sequencing information comprises an order in which associated write data block are received by storage control system 114. This order can comprise a sequence number or counter which tracks an order of receipt, or can be implied by a location in a sequential data structure, such as a chronological list of nodes. The tracking information with associated data structures can be stored by storage control system 114 in a designated location in cache storage region 112, or in a computer-readable memory associated with storage control system 114, such as a RAM, SRAM, flash memory, and the like.

Since archive storage region 113 prefers a sequential burst of write data which can span many write operations, cache storage region 112 caches write data received over a period of time. This write data can be accumulated until a threshold amount is received, and then a burst of write data can be committed into archive storage region 113 from cache storage region 112. This burst of write data can be helpful when write operations to random write locations are received. However, when a write operation is received that supersedes a portion of write data already being cached, then that earlier received write data might block the later received write data from being stored until the earlier write data is committed.

This blocking can also delay messaging to host 140 that indicates completion of the write operation. A write operation completion message can be transferred to host system 140 responsive to the write data being placed into cache storage region 112. However, instead of later received write data immediately modifying or invalidating tracking elements for earlier received write data that is designated for a similar or same storage location, multiple versions of the tracking elements write data are kept in cache storage location for a particular storage location. For example, write data initially received for location '1' as shown in FIG. 1 can be stored in cache storage region 112 even if write data for location '1' is received later in time which overwrites the first write data. Control system 114 creates new tracking elements to track incoming write data in cache storage region 112, and previously created tracking elements remain unmodified even when incoming write data supersedes that of the previously created tracking elements. Some instances have all write data being superseded by later received write data, while other instances have only a portion of the write data being superseded by the later received write data. Tracking elements remain until a commit process is completed for associated write data.

In FIG. 2, responsive to receiving second write data directed to storage locations at least partially overlapping with the storage locations of the first write data, storage control system 114 accepts (204) the second write data into cache storage region 112 and establishes second tracking elements in data structure 115 for the second write data in cache storage region 112 without modifying the first tracking elements. The storage locations of the second write data can be partially overlapping with storage locations of write data currently being tracked in data structure 115. The second write data is stored in cache storage region 112 while the first write data is already stored in cache storage region 112, even though similar storage locations are associated with both data sets. The storage of the second write data in cache storage region 112 is not blocked by the existing first write data in cache storage region 112. Moreover, when a commit process is occurring for first write data to transfer the first write data from cache storage region 112 into archive storage region 113, the second write data is also not blocked from storage into cache storage region and tracking in data stricture 115. Storage control system 114 creates new tracking entries for the second write data in data structure 115 without modification (such as marking invalid or removing) of the tracking entries for the first write data. Specifically, new tracking elements are allocated responsive to receiving new write data, even if existing tracking elements correspond to overlapping storage location or storage blocks as the new write data. Read operations directed to the storage locations of either the first write data or second write data can be serviced from most current blocks of write data stored in cache storage region 112 or archive storage region 113. The commit process can also consider which write data was most recently received into cache storage region 112, and burst transfers of the write data from cache storage region 112 into archive storage region 113 selects the write data from among the first write data and the second write data based at least on a sequence of receipt into the cache storage region.

Advantageously, in the examples herein, cache storage region 112 can hold more than one portion of write data to a similar location, and subsequently received write data is not blocked by prior received write data for a same or similar location. In addition to completion messaging or signaling being indicated to host system 140 without waiting for the earlier data to be committed to archive storage region 113, commit processes currently being performed by storage control system 114 do not block incoming writes to similar or same storage locations. When a specific storage location is having write data committed from cache storage region 112 into archive storage region 113, the specific storage location is not blocked from receiving further writes into cache storage region 112. Data structure 115 can track these further writes and tracks which write data has been committed into archive storage region 113.

Furthermore, write data can be kept in cache storage region 112 until commit process has completed for the entire burst of write data into archive storage region 113. Incoming write data received by the data storage device during the commit process can be received and accepted into cache storage region 112, even if directed to similar storage locations as currently being committed into archive storage region 113. Data structure 115 and storage control system 114 handles tracking of write data to ensure coherency and that read operations are serviced with the most recent data. If write data has been partially committed to archive storage region 113, read operations directed to that write data can be serviced from cache storage region 112 since that data is not removed from cache storage region 112 until a burst write into archive storage region is completed. Once the burst write is complete, then storage control system 112 can invalidate entries in data structure 115 related to associated write data, such as by removing data structure nodes or ring node entries. Read operations to storage locations associated with the completed burst write can be serviced from archive storage region 113 until new write data is received which overwrites that data.

In a specific example, storage control system 114 performs non-blocking caching of write operations into cache storage region 112, the non-blocking caching comprising transferring over storage link 130 completion status for a second write operation responsive to caching write data for the second write operation in cache storage region 112, where the second write operation is directed to a same first storage address or location as write data for a first write operation cached in cache storage region 112 before the write data for the second write operation. The first write data does not block the second write data from being written into cache storage region 112 and a faster response time to host system 140 can be achieved by data storage device 110. Once the threshold amount of write data is received, the commit process can merge write data among the various portions of write data received to only commit to archive storage region 113 the portions of the write data that are modified last in time.

While the write data is in cache storage region 112, read operations might be received by data storage device 110 which are directed to that write data. Storage control system 114 provides from cache storage region 112 read data for the read operations that are directed to write data in cache storage region 112. When more than one version or portion of write data associated with different write operations is stored in cache storage region 112, then control system 114 can merge the data for the read operation among the last written data portions in cache storage region 112.

In another specific example, write data associated with location '1' is received initially and then overwritten by a later received portion of write data for location '1'—as seen in data structure 115. Responsive to a read operation directed to location '1', control system 114 provides read data 132 from the later received write data for location '1'. It should be understood that some portions of read data 132 can be selected from the first write operation to location '1' and other portions of read data 132 can be selected from the second write operation to location '1'—as determined by the portions that are received last in time.

Once a threshold amount of write data has been received, then control system 114 performs a burst write of data in cache storage region 112 into archive storage region 113. Any two or more portions of data that might be destined for the same storage location merged so as to only select last received write data portions for can be a particular storage location. Furthermore, incoming write data to storage locations already tracked by data structure 115 is not blocked by the commit operations, and handed and tracked accordingly in data structure 115.

Returning to the elements of FIG. 1, data storage device 110 includes one or more computer readable storage media 111 accessible via one or more read/write heads and associated electromechanical elements. Data storage device 110 also includes processing circuitry, communication interfaces, armatures, preamps, transceivers, processors, amplifiers, motors, servos, enclosures, and other electrical and mechanical elements. Data storage device 110 can also comprise cache systems, chassis, enclosures, fans, interconnect, cabling, or other circuitry and equipment.

Data storage device 110 can comprise a hard disk drive, hybrid disk drive, or other computer readable storage device. Data storage device 110 can include further elements, such as those discussed for hard disk drives 320-323 in FIG. 3, although variations are possible. The computer readable storage media of data storage device 110 can include rotating magnetic storage media, but can additionally include other media, such as solid state queues or cache systems of data storage device 110. These other media can include solid state storage media, optical storage media, non-rotating magnetic media, phase change magnetic media, spin-based storage media, or other storage media, including combinations, variations, and improvements thereof. In some examples, data storage device 110 comprises a hybrid hard drive employing solid state storage elements in addition to rotating magnetic storage media. Storage media 111 can employ various magnetic storage schemes, such as shingled magnetic recording (SMR), non-shingled magnetic recording, perpendicular magnetic recording (PMR), including combinations, variations, and improvements thereof.

Storage control system 114 includes processing circuitry, communication interfaces, and one or more non-transitory computer-readable storage devices. The processing circuitry can comprise one or more microprocessors and other circuitry that retrieves and executes firmware from memory for operating as discussed herein. The processing circuitry can be implemented within a single processing device but can also be distributed across multiple processing devices or sub-systems that cooperate in executing program instructions. Examples of the processing circuitry include general purpose central processing units, application specific processors, and logic devices, as well as any other type of processing device, combinations, or variations thereof. The communication interfaces can include one or more storage interfaces for communicating with host systems, networks, and the like. The communication systems can include transceivers, interface circuitry, connectors, buffers, microcontrollers, and other interface equipment.

Host system 140 can include processing elements, data transfer elements, and user interface elements. In some examples host system 140 is a central processing unit of a computing device or computing system. In other examples, host system 140 also includes memory elements, data storage and transfer elements, controller elements, logic elements, firmware, execution elements, and other processing system components. In yet other examples, host system 140 comprises a RAID controller processor or storage system central processor, such as a microprocessor, microcontroller, Field Programmable Gate Array (FPGA), or other processing and logic device, including combinations thereof. Host system 140 can include, or interface with, user interface elements which can allow a user of data storage system 100 to control the operations of data storage system 100 or to monitor the status or operations of data storage system 100. These user interface elements can include graphical or text displays, indicator lights, network interfaces, web interfaces, software interfaces, user input devices, or other user interface elements. Host system 140 can also include interface circuitry and elements for handling communications over storage link 130, such as logic, processing portions, buffers, transceivers, and the like.

Storage link 130 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although one bus 130 is shown in FIG. 1, it should be understood that one or more discrete links can be employed between the elements of data storage system 100.

Figure 3:
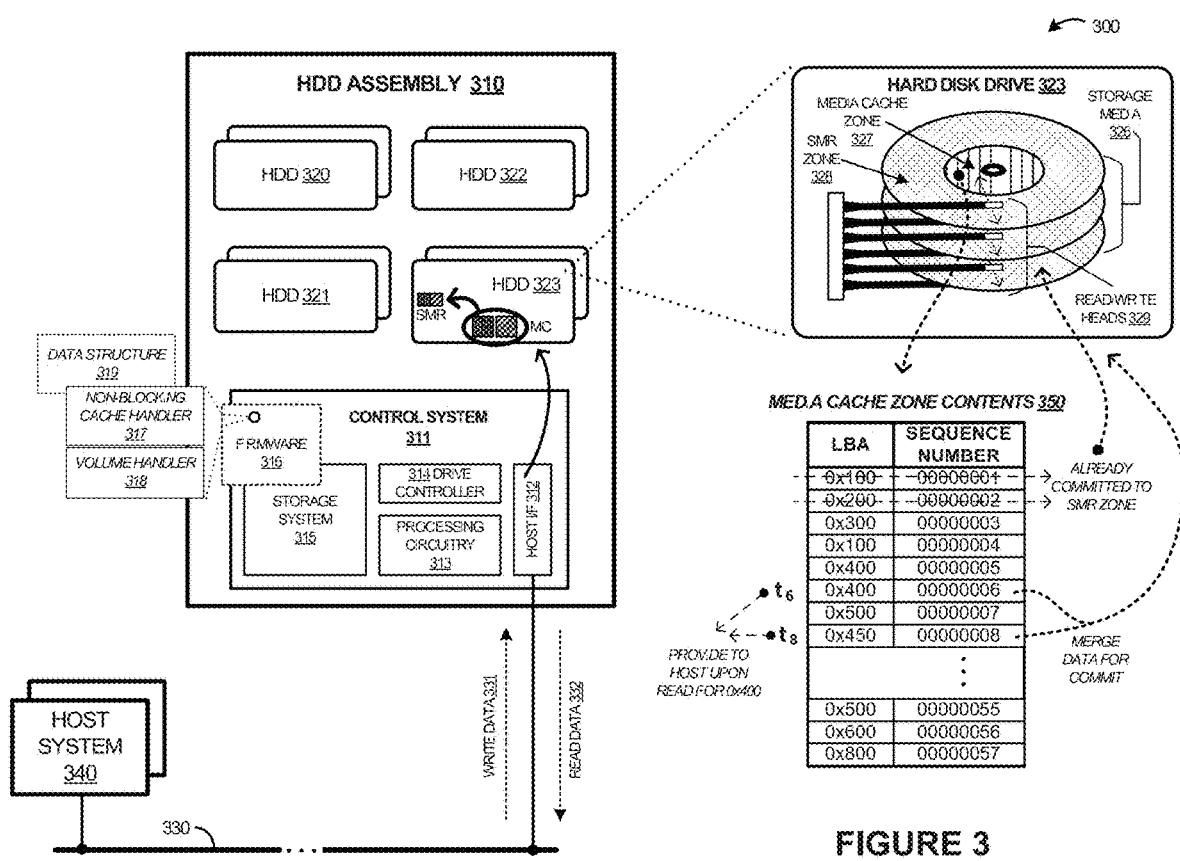
FIG. 3 is a system diagram illustrating a data system.

As a further example data storage system employing a data storage array, FIG. 3 is presented. FIG. 3 is a system diagram illustrating data storage system 300. Data storage system 300 includes hard disk drive (HDD) assembly 310 and one or more host system 340. HDD assembly 310 and host system 340 communicate over storage link 330. Various elements of HDD assembly 310 can be included in data storage device 110 of FIG. 1, although variations are possible. Although one HDD assembly 310 is shown in FIG. 3, it should be understood that more than one HDD assembly could be included and linked to host system 340 or other host systems, such as in a data storage environment employing many hard disk drives in an array.

HDD assembly 310 can comprise a storage assembly with associated enclosure and structural elements which is insertable into a rack that can hold other HDD assemblies, such a rackmount server environment. The enclosure can include structural elements to mount the plurality of HDDs and can also include at least one external connector for communicatively coupling control system 311 or host interface 312 of HDD assembly 310 over storage link 330.

HDD assembly 310 can comprise a redundant array of independent disks (RAID) array, or a JBOD device ("Just a Bunch Of Disks") device which include a plurality of independent disks which can be spanned and presented as one or more logical drives to host system 340. In some examples, HDD assembly 310 comprises a virtual box of disks (VBOD). A VBOD employs SMR hard disk drives in an array. However, SMR disks typically have inefficiencies for random writes due to the shingled nature of adjacent tracks for data. The VBOD abstracts the SMR drives and allows random writes and random reads while still having underlying SMR media which ultimately hold the associated data. In the examples herein, although SMR drives are employed, write data is first cached in one or more other non-SMR regions prior to archival in the associated SMR regions.

Storage link 330 can include one or more links, although a single link is shown in FIG. 3. Storage link 330 can comprise a storage or disk interface, such as Serial Attached ATA (SATA), Serial Attached SCSI (SAS), FibreChannel, Universal Serial Bus (USB), SCSI, InfiniBand, Peripheral Component Interconnect Express (PCIe), Ethernet, Internet Protocol (IP), or other parallel or serial storage or peripheral interfaces, including variations and combinations thereof.

Host system 340 can include one or more computing and network systems, such as personal computers, servers, cloud storage systems, packet networks, management systems, or other computer and network systems, including combinations and variations thereof. In operation, host system 340 issues read and write commands or operations to HDD assembly 310 over storage link 330, among other commands or operations which can include control instructions, metadata retrieval operations, configuration instructions, and the like. Likewise, HDD assembly 310 can transfer read data over storage link 330, among other information such as graphical user interface information, status information, operational information, failure notifications, alerts, and the like.

HDD assembly 310 includes a plurality of hard disk drives (HDDs), namely HDD 320-323, although any number of HDDs can be included. Each HDD 320-323 is coupled to control system 311 by one or more links, which in this example comprises Serial Attached SCSI (SAS) links, although other link types can be employed. Each HDD 320-323 can comprise similar elements, and for exemplary purposes, a detailed view of only HDD 323 is shown in FIG. 3, although variations are possible among HDD 320-323. HDD 323 includes storage media 326, R/W heads 329. HDD 323 can include further elements, such as armatures, preamps, transceivers, processors, amplifiers, motors, servos, enclosures, and other electrical and mechanical elements. In FIG. 3, HDD 323 also subdivides storage media 326 into at least two zones, namely randomly writable media cache zone 327 and SMR zone 328.

HDD assembly 310 also includes control system 311. Control system 311 includes processing circuitry 313, drive controller 314, storage system 315, and host interface (I/F) 312. Furthermore, control system 311 includes firmware 316 which includes non-blocking cache handler 317 and volume handler 318 which, when executed by at least processing circuitry 313, operates as described below.

Control system 311 handles storage operations for HDD assembly 310, such as receiving storage operations from host systems over storage link 330 in host interface 312. Write data 331 can be received in one or more write operations, and read data 332 can be provided to hosts responsive to one or more read operations. An interface can be provided to a host system, such as a single (or redundant) Ethernet port, which allows for the host system to access the storage capacity of HDD assembly. Control system 311 can establish any number of logical volumes or logical storage units across the various HDDs in HDD assembly 310, which can comprise spanning, redundant arrays, striping, or other data storage techniques.

Host interface 312 includes one or more storage interfaces for communicating with host systems, networks, and the like over at least link 330. Host interface 312 can comprise transceivers, interface circuitry, connectors, buffers, microcontrollers, and other interface equipment. Host interface 312 can also include one or more I/O queues which receive storage operations over link 330 and buffers these storage operations for handling by processing circuitry 313.

Control system 311 also includes processing circuitry 313, drive controller 314, and storage system 315. Processing circuitry 313 can comprise one or more microprocessors and other circuitry that retrieves and executes firmware 316 from storage system 315. Processing circuitry 313 can be implemented within a single processing device but can also be distributed across multiple processing devices or subsystems that cooperate in executing program instructions. Examples of processing circuitry 313 include general purpose central processing units, application specific processors, and logic devices, as well as any other type of processing device, combinations, or variations thereof. In some examples, processing circuitry 313 includes a system-on-a-chip device or microprocessor device, such as an Intel Atom processor, MIPS microprocessor, and the like.

Drive controller 314 can include one or more drive control circuits and processors which can control various data redundancy handling among the various HDDs of HDD assembly 310. Drive controller 314 also includes HDD interfaces, such as SAS interfaces to couple to the various HDDs in HDD assembly 310. In some examples, drive controller 314 and processing circuitry 313 communicate over a peripheral component interconnect express (PCIe) interface or other communication interfaces. In some examples, drive controller 314 comprises a RAID controller, RAID processor, or other RAID circuitry.

Storage system 315 can comprise any non-transitory computer readable storage media readable by processing circuitry 313 or drive controller 314 and capable of storing firmware 316. Storage system 315 can include volatile and nonvolatile, removable and non-removable media implemented in any method or technology for storage of information, such as computer readable instructions, data structures, program modules, or other data. In addition to storage media, in some implementations storage system 315 can also include communication media over which firmware 316 can be communicated. Storage system 315 can be implemented as a single storage device but can also be implemented across multiple storage devices or sub-systems co-located or distributed relative to each other. Storage system 315 can comprise additional elements, such as a controller, capable of communicating with processing circuitry 313. Examples of storage media of storage system 315 include random access memory, read only memory, magnetic disks, optical disks, flash memory, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Firmware 316, non-blocking cache handler 317, and volume handler 318 can be implemented in program instructions and among other functions can, when executed by control system 311 in general or processing circuitry 313 in particular, direct control system 311 or processing circuitry 313 to operate as described herein. Firmware 316 can include additional processes, programs, or components, such as operating system software, database software, or application software. Firmware 316, non-blocking cache handler 317, and volume handler 318 can also comprise software or some other form of machine-readable processing instructions executable by processing circuitry 313. In at least one implementation, the program instructions can include first program instructions that direct control system 311 to receive write operations and responsively store write data in a cache storage region prior to transferring into a SMR storage region using the non-blocking processes described herein (non-blocking cache handler 317), report completion of the write operations to the host system upon caching, determine logical arrangements of the various HDDs for addressing and redundancy of cached data and archival of committed data (volume handler 318), and provide read data retrieved from any of the HDDs to the host system, among other operations.

In general, firmware 316 can, when loaded into processing circuitry 313 and executed, transform processing circuitry 313 overall from a general-purpose computing system into a special-purpose computing system customized to operate as described herein. Encoding firmware 316 on storage system 315 can transform the physical structure of storage system 315. The specific transformation of the physical structure can depend on various factors in different implementations of this description. Examples of such factors can include, but are not limited to the technology used to implement the storage media of storage system 315 and whether the computer-storage media are characterized as primary or secondary storage. For example, if the computer-storage media are implemented as semiconductor-based memory, firmware 316 can transform the physical state of the semiconductor memory when the program is encoded therein. For example, firmware 316 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 4:
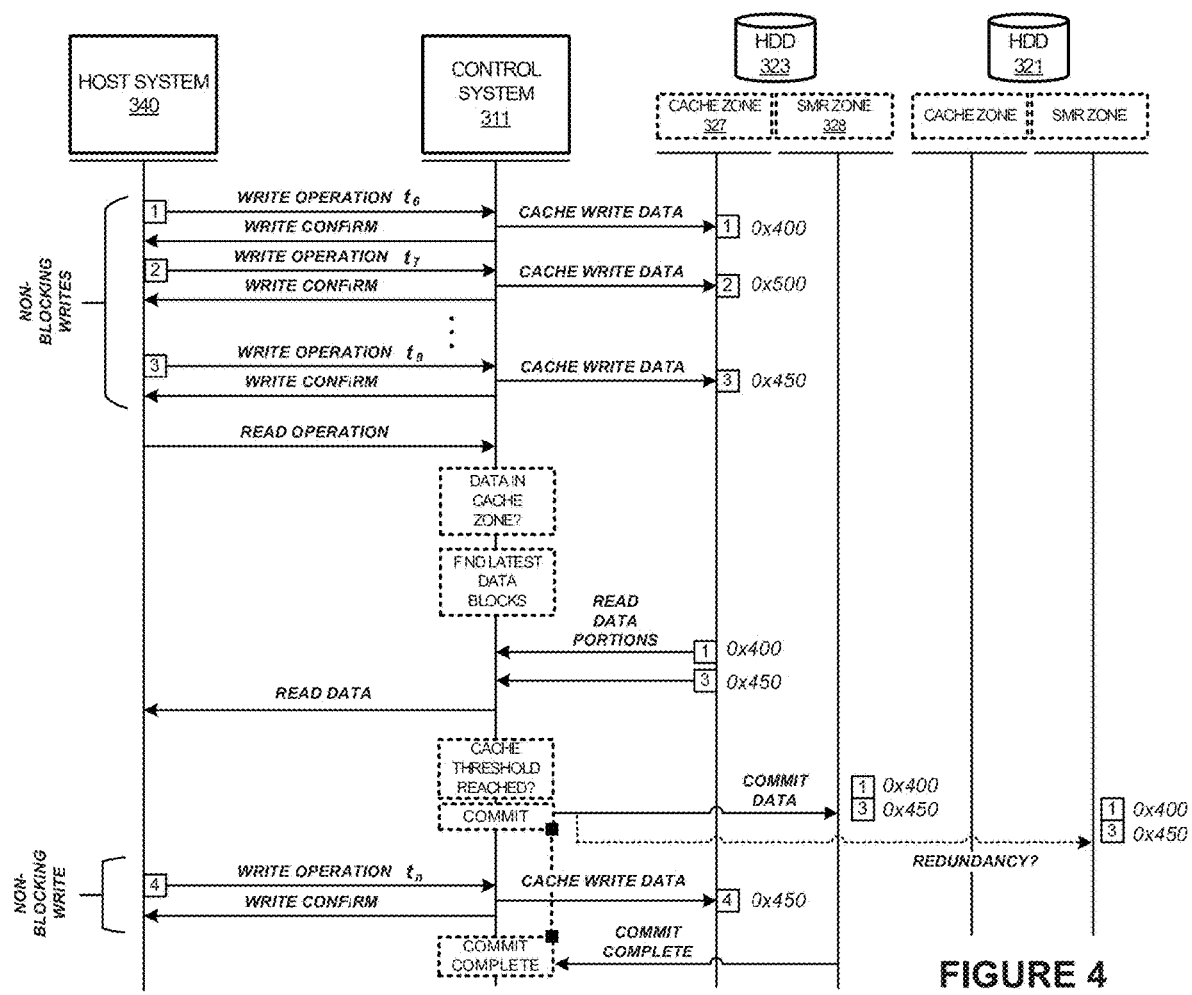
FIG. 4 is a flow diagram illustrating a method of operation of a data storage system.

To further illustrate the operation of system 300 and HDD assembly 310, FIG. 4 is presented. FIG. 4 is a sequence diagram illustrating a method of operation of HDD assembly 310. In FIG. 4, HDD assembly 310 receives write data for storage by HDD assembly 310. This write data is associated with one or more write operations which are received over link 330 from host system 340, such as write data 331 in FIG. 3. Write data can comprise one or more data blocks for storage by HDD assembly 310 which is directed for storage at a designated storage address or storage location. HDD assembly 310 stores write data for later retrieval by host 340 on associated HDDs. However, in this example, upon receipt of write data, HDD assembly 310 caches write data in a cache zone of at least one HDD prior to committing write data into an SMR region of at least one HDD.

A particular HDD or set of HDDs can be designated to handle data for a particular logical storage unit (LUN) or storage partition. Write operations can be directed to any of the logical partitions, and indicate a storage address, logical unit, partition, or other indication which designates logical blocks that in HDD assembly 310 that write data associated with a write operation is directed. However, before the write data is stored in the location designated by the write operation, the write data is cached in a cache zone of an associated HDD.

In FIG. 4, three example write operations are highlighted. These three write operations are received at times $t_6$, $t_7$, and $t_8$. Further write operations are shown in table 350 of FIG. 3, some of which are received prior to the write operations highlighted in FIG. 4 and some of which are received after. In some examples, table 350 is stored and maintained in a data structure by control system 311, such as in data structure 319.

The entries of table 350 can comprise tracking nodes of a data structure which track portions of write data, such as associated with individual write operations. In FIG. 3, table 350 is organized chronologically, according to a receipt of write operations over host link 330. A tracking node can describe any number of sectors, such as from 1 to 256 sectors which can correspond to 4 KiB to 1 MiB storage space. Each tracking node describes a cache block address, a quantity of data blocks, and an associated physical location of the data.

A first write operation in FIG. 4 is directed to storage location 0x400 for 0x100 data blocks, a second write operation is directed to storage location 0x500 for 0x100 data blocks, and a third write operation is directed to storage location 0x450 for at least 0xB0 data blocks. In this example, the third write operation to storage location 0x450 partially overwrites the write data for the first write operation to storage location 0x400, namely for locations 0x450 to 0x4FF. Table 350 also includes a sequence number which can be used to determine an ordering of write data placed into cache zone 327. Furthermore, various memory or location pointers can be employed by control system 311 to point to a last-written portion of data in cache zone 327 for a particular storage location, such as an LBA. In the examples herein, an old pointer for previously written data is not erased immediately responsive to a write operation with new write data. Instead both pointers are maintained to aid in the non-blocking write operations discussed. Once write data is committed to an SMR zone then the pointers can be merged or removed as necessary. It should be understood that the storage locations presented herein are merely exemplary, and other locations or addressing schemes can be employed.

In some HDDs or storage systems, when write data to a particular location is held in a cache then a subsequent write operation to that particular location must wait until the first write data is committed. In other example HDDs or storage systems, tracking information, such as cache tracking information, must be resolved or merged before write data to a similar or same storage location is accepted into a cache region. These HDDs or storage systems thus block new write data from storage in a cache region until existing data for similar storage locations is committed or tracking entries merged.

However, in this example, write data for overlapping write operations to the same particular storage location are stored in cache zone 327 by HDD 323. Moreover, data structure, such as table 350, holds tracking entries for overlapping write operations without new entries being blocked by existing entries. Any newly received write data is accepted into cache zone 327 and tracked by table 350 without regard to storage locations of existing entries or write data in cache zone 327. Reads directed to those storage locations are serviced from among any of the data in cache zone 327 and control system 311 provides the most recently written data using table 350 as a reference to select blocks of data received last in time. Even during a later burst commit process to move a burst of data from cache zone 327 into SMR zone 328, reads can be serviced from among the data in cache zone 327 and new write data can be accepted and tracked by table 350 without being blocked by the current burst commit process.

Continuing with the operation of FIG. 4, processing circuitry 313 indicates to host system 340 that the third write operation has completed using an associated write confirmation message. Thus, after each of the three highlighted writes shown in FIG. 4, a write confirmation message is transferred for delivery to host system 340 once associated write data is stored into cache zone 327 of HDD 323. These write confirmation messages are not blocked by prior write data waiting to be committed to a similar storage location. Similar non-blocking write confirmations can occur for the other write operations indicated in table 350 of FIG. 3. Also, tracking entries for all incoming write operations are tracked in table 350, regardless if the incoming write operations overlap storage locations with existing entries.

At some time, after the three example writes are cached into cache zone 327, a read operation is received by HDD assembly 310 over storage link 330 from host system 340. This read operation can be directed to a storage location of data held in cache zone 327 or a storage location of data held in SMR zone 328. In the example of data held in SMR zone 328, associated read data can be read and provided to host system 340.

However, if the associated read data is in cache zone 327, then data is read from last-in-time data portions. For example, if the read operation is directed to location 0x400, then processing circuitry 313 responsively finds data in cache zone 327 which corresponds to the last written data for that storage location. Specifically, the write operation at time $t_8$ partially overwrote the write data received at time $t_6$. Processing circuitry 313 can identify portions of the write data for storage location 0x400 that had been received last in time and merge this data into a response to host 340 that includes read data corresponding to the proper data from cache zone 327. Processing circuitry 313 selects first data blocks of the read data from the write data associated with the first of the write operations (location 0x400) and selects second data blocks of the read data from the write data associated with the third of the write operations (location 0x450) that is received after the first of the write operations by HDD assembly 310. Processing circuitry 313 and host interface 312 then transfers these data blocks as read data responsive to the read operation to location 0x400 in FIG. 4.

Control system 311 continues to cache write data in cache zone 327 of HDD 323 until a cache commit event is reached. The cache commit event can comprise HDD assembly 310 receiving a threshold amount of write data, such as a predetermined number of data blocks held in cache zone 327. The cache commit event can comprise an associated cache zone filling with data past a threshold level. The cache commit event can be a time threshold, where after a predetermined amount of time any cached data will be committed. Other cache commit events can be established, including combinations thereof. When enough data has been cached into cache zone 327 or after another threshold (such as a timing threshold), then any data held in cache zone 327 can be burst written into SMR zone 328. When multiple portions of data are held in cache zone 327 for a similar or same storage location, then processing system 313 will merge this data to only burst write the last-received write data blocks into SMR zone 328. In this example, data blocks from both the write to storage location 0x400 and to storage location 0x450 are merged into a single data set for storage at location 0x400 in SMR zone 328.

The burst commit process in FIG. 4 includes transferring write data held in cache zone 327 into SMR zone 328. However, write data is not deleted or removed from cache zone 327 until the burst commit process completes. The completion can be signaled by a transfer of all of the associated write data into SMR zone 328 followed by a successful error check of the data in SMR zone 328. Control system 311 can then mark the committed data as deleted or free space in cache zone 327 for use in storing subsequently received write data. Moreover, the entries of table 350 are not marked as invalid, deleted, removed, or otherwise freed until the burst commit process completes. Thus, any intervening read operations received for storage locations currently being committed can still be serviced from cache zone 327 without the commit process blocking servicing of the read operations. Likewise, any intervening write operations received for storage locations currently being committed can still have write data stored into from cache zone 327 and tracking entries included in table 350 without the commit process blocking servicing of the write operations. Write operation '4' in FIG. 4 at later time $t_n$ illustrates an intervening write operation to location 0x450 while write data associated with location 0x450 is being committed into SMR zone 328. HDD assembly 310 can accept this write operation and include a tracking entry in table 350 as well as store associated write data in cache zone 327 during this commit process.

In addition to committing the write data in cache zone 327 of HDD 323 into SMR zone 328 of HDD 323, a redundant commit process can occur. This redundant commit process can commit mirrored copies of the write data held in cache zone 327 into more than one HDD or more than one SMR zone. FIG. 4 shows one possible example of this redundant operation.

Advantageously, in the examples herein, host system 340 does not write directly in to SMR zone 328 of HDD 323 or any other HDD in HDD assembly 310, and instead write data is first placed in a cache zone of an associated HDD and tracked in an associated data structure. Cache zone 327 and the associated tracking entries can handle more than one portion of write data to a same or similar location, where subsequently received write data is not blocked or interlocked by prior received write data for an overlapping location. Completion messaging or signaling is indicated to host system 340 without waiting for the earlier data to be committed to SMR zone 328. In a specific example, control system 311 performs non-blocking caching of write operations into cache zone 327, the non-blocking caching comprising transferring over storage link 330 completion status for a second write operation responsive to caching write data for the second write operation in cache zone 327, where the second write operation is directed to a same first storage address or location as write data for a first write operation cached in cache zone 327 before the write data for the second write operation. The first write data does not block the second write data from being written into cache zone 327 and a faster response time to host system 340 can be achieved by HDD assembly 310.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage device, comprising:
    storage media comprising a cache storage region and an archive storage region, wherein:
        the cache storage region comprises a random write storage region; and
        the archive storage region comprises a shingled magnetic recording (SMR) storage region; and
    a storage control system configured to:
        accumulate write data associated with multiple write operations into the cache storage region;
        for each of the multiple write operations, establish, in a data structure stored in the cache storage region, tracking elements that track one or more locations in the SMR storage region to which a corresponding portion of the write data is to be written, wherein at least a first portion and a second portion of the write data are destined for a same location in the SMR storage region;
        prior to committing the write data to the SMR storage region, select commit data for transfer into the SMR storage region using the tracking elements, wherein the at least first portion and the second portion of the write data are merged such that only a last-accumulated write data of the at least first portion and the second portion of the write data is selected; and
        responsive to the write data partially committing,
            service from the cache storage region a read operation directed to the write data, wherein:
                a first portion of the commit data is selected from the cache storage region for servicing the read operation from the at least first portion of the write data and a second portion of the commit data is selected from the cache storage region for servicing the read operation from the second portion of the write data, and
                the first and the second portions of the commit data are selected for servicing the read operation based on which write data was received last in time.

2. The data storage device of claim 1, wherein the storage control system is further configured to:
    perform a commit process that burst transfers the commit data from the cache storage region into the SMR storage region.

3. The data storage device of claim 2, wherein the storage control system is further configured to:
    accept the multiple write operations without blocking until the commit process is performed; and
    provide a write completion indication to a host system for each of the multiple write operations upon accumulation of the corresponding write data into the cache storage region.

4. The data storage device of claim 2, wherein the storage control system is further configured to:
    responsive to completion of the commit process for at least the commit data, invalidate at least corresponding ones of the tracking elements.

5. The data storage device of claim 1, wherein the storage control system is further configured to:
    during a commit process that transfers the commit data from the cache storage region into the SMR storage region, receive further write data directed to further storage addresses at least partially overlapping with storage addresses of the commit data; and
    accept the further write data into the cache storage region without being blocked by the commit data being burst transferred.

6. The data storage device of claim 1, wherein each tracking element of the tracking elements comprises sequence information and storage address indicators.

7. The data storage device of claim 1, wherein the storage control system is further configured to:
    responsive to read operations received by the data storage device, select first data blocks of read data from the first write data in the cache storage region and select second data blocks of the read data from the second write data in the cache storage region.

8. The data storage device of claim 1, wherein the SMR storage region and the random write storage region are included on rotating magnetic media of a hard disk drive comprising the storage media.

9. A method of operating a data storage device with storage media that includes a cache storage region and an archive storage region, wherein the cache storage region comprises a random write storage region of the storage media and the archive storage region comprises a shingled magnetic recording (SMR) storage region, the method comprising:
    accumulating write data associated with multiple write operations from a host system into the cache storage region;
    responsive to accumulating the write data, establishing, in a data structure stored in the cache storage region, tracking elements that track a plurality of SMR storage region locations to which corresponding portions of the write data are to be stored, wherein a first portion and a second portion of the write data are to be stored in a same SMR storage region location in the SMR storage region;
    prior to committing the write data to the SMR storage region, selecting commit data for transfer into the plurality of SMR storage region locations in the SMR storage region based, at least in part, on the tracking elements, wherein the first portion and the second portion of the write data are merged such that only a last accumulated write data of the first portion and the second portion of the write data is selected for inclusion in the commit data; and
    responsive to the write data partially committing,
        servicing from the cache storage region a read operation directed to the write data, wherein:
            a first portion of the commit data is selected from the cache storage region for servicing the read operation from the first portion of the write data and a second portion of the commit data is selected from the cache storage region for servicing the read operation from the second portion of the write data, and the first and the second portions of the commit data are selected for servicing the read operation based on which write data was received last in time.

10. The method of claim 9, further comprising:
performing a commit process that burst transfers the commit data from the cache storage region into the SMR storage region.

11. The method of claim 10, further comprising:
accepting the multiple write operations without blocking; and
providing a write completion indication to the host system for each of the multiple write operations upon storage of the corresponding write data into the cache storage region.

12. The method of claim 10, further comprising:
responsive to completion of the commit process for at least the commit data, invalidating at least corresponding ones of the tracking elements.

13. The method of claim 9, further comprising:
during a commit process that transfers the commit data from the cache storage region into the SMR storage region, receiving further write data directed to further storage addresses at least partially overlapping with storage addresses of the commit data; and
accepting the further write data into the cache storage region without being blocked by the commit data being burst transferred.

14. The method of claim 9, wherein the tracking elements comprise sequence information and storage address indicators.

15. The method of claim 9, further comprising:
responsive to read operations received by the data storage device, selecting first data blocks of read data from the first set of write data in the cache storage region and selecting second data blocks of the read data from the second set of write data in the cache storage region.

16. The method of claim 9, wherein the SMR storage region and the random write storage region are included on rotating magnetic media of a hard disk drive comprising the storage media.

17. A data storage assembly, comprising:
a plurality of data storage drives, each comprising associated magnetic storage media having a cache storage region and a shingled magnetic recording (SMR) storage region; and
a storage control system configured to:
  accumulate write data associated with multiple write operations received over a host interface from a host system into the cache storage region;
  in a data structure, establish tracking elements that track the storage locations of the write data in the cache storage region, wherein a first portion and a second portion of the write data are to be stored in a same SMR storage region location in the SMR storage region;
  prior to committing the write data to the SMR storage region and based at least in part on the tracking elements, determine commit data merged from among the first portion and the second portion of the write data such that only a last accumulated write data of the first portion and the second portion of the write data is selected for inclusion in the commit data;
  perform a commit process that transfers the commit data from the cache storage region into the SMR storage region; and
  responsive to the write data partially committing, service from the cache storage region a read operation directed to the write data, wherein:
    a first portion of the commit data is selected from the cache storage region for servicing the read operation from the at least first portion of the write data and a second portion of the commit data is selected from the cache storage region for servicing the read operation from the second portion of the write data, and
    the first and the second portions of the commit data are selected for servicing the read operation based on which write data was received last in time.

18. The data storage assembly of claim 17, wherein:
the cache storage region of the data storage drives comprises a cache storage region of a first data storage drive; and
the SMR storage region of the data storage drives comprises an SMR storage region of a second data storage drive.

19. The data storage assembly of claim 17, wherein the storage control system is further configured to:
during the commit process, accept additional write data into the cache storage region without blocking.

20. The data storage assembly of claim 17, wherein the storage control system is further configured to:
provide a write completion indication to the host system for each of the multiple write operations upon accumulation of the corresponding write data into the cache storage region.

21. A storage system comprising:
means for persistently storing data using shingled magnetic recording (SMR);
means for storing the data in cache prior to the data being committed to the means for storing using SMR;
means for accumulating write data associated with multiple write operations into the means for storing in cache;
means for establishing, for each of the multiple write operations, in a data structure in the means for storing in cache, tracking elements configured to track one or more locations in the means for storing using SMR to which a corresponding portion of the write data is to be written, wherein a first portion and a second portion of the write data are destined for a same location in the means for storing using SMR;
means for selecting using the tracking elements, prior to committing the write data to the means for storing using SMR, commit data for transfer into the means for storing using SMR,
wherein the first portion and the second portion of the write data are merged so only a last accumulated write data of the at least first portion and the second portion of the write data is selected; and
means for servicing from the means for storing in cache, responsive to the write data partially committing, a read operation directed to the write data,
wherein:
a first portion of the commit data is selected from the means for storing in cache, for servicing the read operation from the first portion of the write data, and a second portion of the commit data is selected from the means for storing in cache, for servicing the read operation from the second portion of the write data, and the first and the second portions of the commit data are selected for servicing the read operation based on which write data was received last in time.

* * * * *